United States Patent [19]

Vrielink

[11] Patent Number: 4,559,612
[45] Date of Patent: Dec. 17, 1985

[54] SORTING DEVICE FOR DATA WORDS

[75] Inventor: Hendrik Vrielink, Eindhoven, Netherlands

[73] Assignee: U.S. Philips Corporation, New York, N.Y.

[21] Appl. No.: 535,002

[22] Filed: Sep. 22, 1983

[30] Foreign Application Priority Data

Oct. 4, 1982 [NL] Netherlands ............... 8203844

[51] Int. Cl.⁴ .................................. G06F 7/24
[52] U.S. Cl. .................................. 364/900
[58] Field of Search ... 364/200 MS File, 900 MS File

[56] References Cited

U.S. PATENT DOCUMENTS

| | | | |
|---|---|---|---|
| 3,587,057 | 6/1971 | Armstrong | 364/900 |
| 3,713,107 | 1/1973 | Barsamian | 364/200 |
| 4,031,520 | 6/1977 | Rohner | 364/900 |

Primary Examiner—Raulfe B. Zache
Attorney, Agent, or Firm—Jack E. Haken; James J. Cannon, Jr.

[57] ABSTRACT

An integrated sorting device for data words comprises a bidirectional bus (54) to which are connected the address input (AD) of a memory (52), a command register (66) for memory clear, sorting criterion and pointer reset signals, a multiplexer (74) and an address counter (98). In a write mode of operation, data words arriving on the bus address the memory and representations thereof, e.g. binary 1s, are stored therein. Briefly before each such storage operation, the same memory location is read and any representation (DOUT) already stored therein is used to trigger flip-flop (82) to indicate that an overflow condition exists. During a read operation, the address counter addresses the successive memory addresses under the control of an oscillator (88). When a filled memory location is reached, a further flip-flop (94) causes the counter to stop and a "ready" signal (RDY) is outputted. The counter resumes counting when the relevant memory location has been read completely. The multiplexer feeds the overflow signal and a read termination signal derived from the address counter to the bus.

8 Claims, 7 Drawing Figures

SORTING DEVICE FOR DATA WORDS

BACKGROUND OF THE INVENTION

The invention relates to a sorting device for data words, comprising a data input for receiving the data words, a memory having an address input to which said data input is coupled and a data input which is activated in a write mode of operation to cause representations of data words received to be stored in said memory, and read control means for reading the representations stored at a sequence of addresses in said memory in order to present the memory address associated with each representation on a data output.

A device of this kind is known from published patent application Ser. No. 8,133,711. The known device, however, is not very suitable for use as a module in a large system, for example in a general purpose computer system or a data processor which is constructed entirely as an integrated circuit. It is an object of the invention to provide a device which can be included in a memory system in a simple manner; it may be possible to map such a device on a single address of such a system.

SUMMARY OF THE INVENTION

The invention provides a sorting device for data words, comprising a data input for receiving the data words, a memory having an address input to which said data input is coupled and a data input which is activated in a write mode of operation to cause representations of data words received to be stored in said memory, and read control means for reading the representations stored at a sequence of addresses in said memory in order to present the memory address associated with each representation on a data output, characterized in that the sorting device is constructed as an integrated circuit and comprises a bidirectional bus which constitutes the device data input and the data output, a command register coupled to said bus for receiving memory clear, sorting criterion and pointer reset signals thereform, a counter having its count output coupled to said bus, which counter counts, in a read mode of operation, pulses from an oscillator in order to produce a sequence of addresses of the memory successively on its count output, said counter having inputs coupled to said command register for receiving said sorting criterion and pointer reset signals thereform as count-direction-determining and set-count signals respectively and a further output for a termination signal. Said counter is provided with blocking means for blocking, under the control of the relevant representation, the counting of the oscillator pulses when an address which corresponds to a memory location containing a valid representation appears on its count output and for producing a ready-to-read signal for a user device when this occurs; means being provided for resetting said blocking means, under the control of a memory read signal, to thereby terminate said blocking after the reading of the complete content of the memory location corresponding to the address currently present on the output of the counter; means for applying, in said write mode of operation in response to received write commands, write and activation signals to said memory in such manner that each write signal will be delayed relative to the corresponding activation signal so that an intermediate read operation will occur at the same address, an overflow detection circuit for generating an overflow signal in response to the reading of a previously stored representation or predetermined number of previously stored representations in such an intermediate read operation, and switch means for applying said termination and overflow signals to the bus as status signals. The use of a bidirectional bus which is also employed to carry a number of command signals and status signals is attractive when the device is to be incorporated in a computer system. Moreover, because of the intermediate read operations, an overflow condition can be readily detected.

The device may include a representation counter as means for incrementing the count in said representation counter each time said write signal occurs at least if a said overflow signal is not produced in respect of the relevant write operation, and switch means for applying the count in said counter to said bus. Such a representation counter can count the total number of stored representations; this may be useful information for a user device, for example in order to determine the amount of storage space required for storage of the sorted data words after the sorting operation. (The storage capacity of the sorting device is hardly ever used optimally and, moverover, for example, the operation "seek the highest value but 7" can be implemented only with difficulty therein; for that purpose subsequent storage in a directly addressable memory is more attractive).

The device may include a second bidirectional bus coupled to a further multi-bit data input/output of said memory for exchanging, together with the storage and retrival of said representations, address pointer words for a further memory with said memory. Such a pointer word may, for example, indicate an address where a comparatively large amount of information is stored. Long data words (for example, having a length of four bytes) or even information blocks can thus be stored according to their respective arguments. Obviously, as far as the pointer address is concerned, one of the known addressing mechanisms, indirect or otherwise, may be implemented.

Said memory may be capable of storing a plurality of said representations et each address, and means may be provided for sequentially filling the storage capacity at the various addresses during successive write operations thereat and sequentially vacating the storage capacity at the various addresses during successive read operations thereat. If this is the case, memory files which contain some mutually identical data words can be stored.

Preferably, the sorting device is incorporated as one unit in a single integrated circuit. This results in an attractive component for notably a so-called singlecard micro-computer.

The invention also relates to an integrated data processor which is characterized in that a sorting device for quickly sorting data words is also integrated, said sorting device comprising a first data input for the data words, a memory comprising an address input which receives signals from the first data input, a second data input of said memory being activated in order to store a representation of said data word, said sorting device also comprising read means for reading the representations stored in an address sequence in order to present the memory address associated with each representation on a data output, again the sorting device comprising a bidirectional bus as the first data input and data output which is connected to one of the internal bus lines of the data processor and also comprising control inputs for receiving erase control, sequence direction and address reset signals, and control outputs for supplying a termination signal and an overflow signal as status signals, to the bus there being connected a counter which counts pulses from an oscillator in order to output the addresses of the memory successively on the counter output, said counter comprising inputs for receiving said sequence direction and address reset signals and an additional output for said termination signal, said counter also comprising a blocking means for blocking, under the control of the relevant representation, the counting of the oscillator pulses when a memory address is output which which indicates a valid representation in said memory, thus supplying a "ready-to-read" signal, said blocking means comprising a reset input for terminating said blocking, under the control of a read signal, after the reading of the complete content of a memory address, said memory device also comprising a delay element for delaying a write command received in order to perform an intermediate read operation under the control of an activation signal, there also being provided a detection circuit for the selective formation of said overflow signal under the control of a read, previously stored representation and the last write command received. This may be a so-called general purpose microprocessor but also a special purpose data processor. Some examples in this respect are a data base processor, a signal processor and an input-output processor. The functions of such specific processors per se are not unique for this purpose, but usually they have been optimized in order to achieve a suitable compromise between cost and performance. The sorting function usually represents an attractive improvement or extension of the performance.

BRIEF DESCRIPTION OF THE FIGURES

Embodiments of the invention will be described in detail hereinafter, by way of example, with reference to the accompanying diagrammatic drawings.

FIGS. 5a and 5b show an elaboration of the circuit of FIG. 4 which enables mutually identical data words to be dealt with.

DESCRIPTION OF A COMPUTER SYSTEM.

Figure 1:
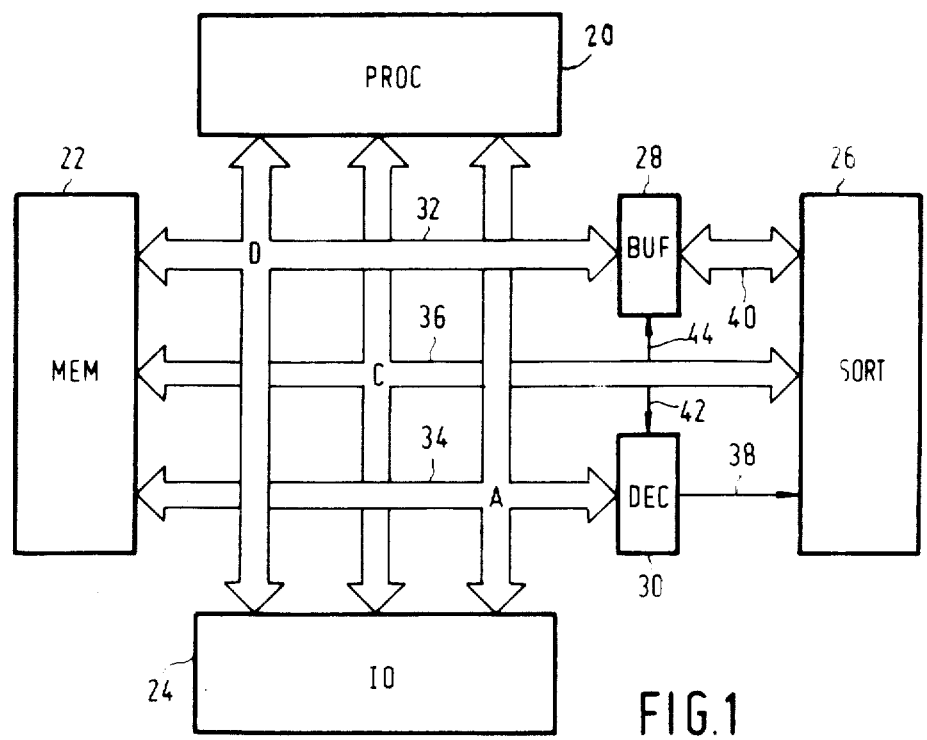
FIG. 1 shows a computer system incorporating a quick sorting device in accordance with the invention.

FIG. 1 shows a computer system incorporating a quick sorting device in accordance with the invention. This computer system comprises a processor 20, for example a conventional microcomputer. The internal communication in the computer system is provided by a data bus 32 having a width of, for example, 8 bits, an address bus 34 having a width of, for example, 16 bits, and a control bus 36 for the transport of control signals. For the sake of brevity, the nature of these control signals will not be elaborated upon hereinafter except insofar as they relate to the control of the quick sorting device. The computer system also comprises a main memory 22 having a capacity of, for example, 64 kbytes. As will be explained hereinafter, one of the address locations is mapped by the quick sorting device and hence it is not used in the memory 22. The computer system also comprises an I/O subsystem 24 for communication with the environment or for secondary storage. The subsystem may thus include a magnetic disc memory, a keyboard device, a data communication unit and a video display device. The control units of the memory and the I/O subsystem are not shown. Finally, the computer system comprises a quick sorting device 26, constructed as an integrated circuit. Device 26 is connected to the relevant bus lines. To this end there is provided an address decoder 30 which is connected to the address bus 34 in order to detect the presence of a predetermined address thereon. An activation signal is supplied from the control bus 36 via the line 42. The quick sorting device is thus mapped on said predetermined address. The activation signal is formed when a memory access is performed. When the relevant predetermined address is indeed present on the address bus, the decoder 30 applies a secondary activation signal to the quick sorting device 26 via the line 38, so that a read or write operation can be performed therein. Also provided is a data buffer 28 which is connected to the data bus 32 in order to buffer a data word in either direction. This buffer may be constructed as a tri-state buffer; its three states are low, high, and terminated by a high impedance. The data buffer 28 is connected to the quick sorting device 26 via a bus 40. In practice the data buffer 28 will form part of the quick sorting device 26 so that, if desired, the entire subsystem 26+28+40 may form a single integrated circuit. A signal on line 44 acts as a control signal for the data buffer 28, for example as a read/write control signal. The embodiment shown comprises a single processor 20. The computer system may be designated to perform several tasks in rapid succession (multiprocessing). It may moreover comprise a distributed processor. These aspects will not be elaborated upon herein in as far as they do not directly affect the quick sorting device. The system shown may be constructed so that the subsystems 20, 22, 24, 26, 30 are each constituted by a respective integrated circuit. It is alternatively possible to construct the subsystems 20, 24, 26, 28, 30 together as one integrated circuit or, the entire system shown in FIG. 1 as one integrated circuit. The processor 20, integrated or not with the subsystems 26 (28), may be constructed as a general purpose microprocessor such as the Signetics Corporation "2650" microprocessor. It may also be a signal processor of the type 8300 from the same Company. It may also be a data file processor whose principal functions are the sorting, selection, combination and searching of data files. The latter functions are known.

Some particular constructions for the device 26 will be described in detail hereinafter, that is to say first at the system level as represented in a block diagram, subsequently as constructed from a number of logic circuits combined in a so-called breadboard realization, and finally as constructed as a single integrated circuit.

Figure 2:
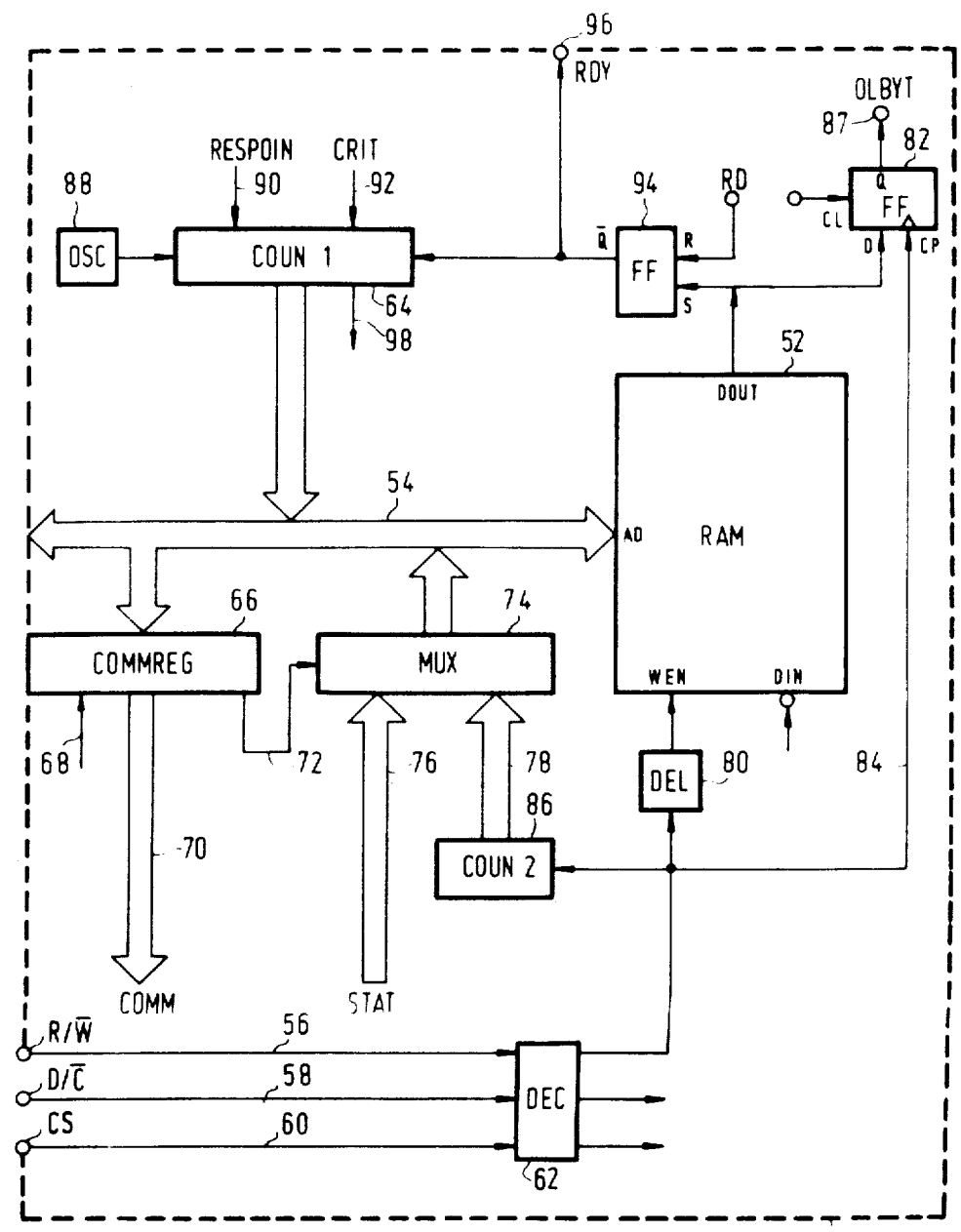
FIG. 2 is a block diagram of an example of a quick sorting device in accordance with the invention.

FIG. 2 is a block diagram of an example of a quick sorting device in accordance with the invention. Within the conventional envelope 50 of the integrated circuit block there is accommodated a storage device 52. This is a random access read/write memory having a capacity of 256 1-bit words. Its address input is connected to a bidirectional internal bust 54 which has a width of 8 bits and which is connected to the secondary bus 40 shown in FIG. 1. Three input control lines are shown. Control line 56 carries a read/write control signal and is activated by the relevant connection of the bus 36. Control line 58 carries a bivalent signal D/C̄ which indicates a word appearing on the bus 54 has the significance "data word" or "control word". Both significances may be applicable to both transport directions. Control line 60 carries a bivalent signal C̄S̄ (chip select) which indicates whether the quick sorting device is selected or not. This is, for example, the signal appearing on line 38 in FIG. 1. Element 62 is a control decoder which receives the signals on the lines 56, 58 and 60 and which applies control signals to the other elements of the sorting device. For the sake of clarity, paths for synchronizing clock signals, a chip enable signal which enables the sorting device, handshake signals and further output connections of the decoder 62 are not shown. The sorting device acts on data words as follows:

during a write operation, a bit is stored in the storage location in the memory 52 which is addressed by the data during a read operation, the count in an address counter 64 is outputted as data to a user device on the bus 54 when this count corresponds to an occupied memory location; the relevant memory location can be cleared, but no facilities are provided for this purpose in the present embodiment.

The foregoing is realized as follows. First a command word is stored in a command register 66 which is connected to the bus 54. The register 66 is loaded by a load control signal on line 68, which signal is formed by the decoder 62. The command register 66 outputs further control signals on a multiple line 70, possibly via a command decoder (not shown). These control signals are:

"clear memory";

"reset pointer", i.e. set the counter 64 to a specific count;

"sorting criterion" (i.e. according to increasing or decreasing magnitude).

It also outputs on line 72 a selection signal for switch means in the form of a multiplexer 74. The latter signal has at least three permissible values which result in conduction of signals on a multiple line 76, signals on a multiple line 78 and none of these signals, respectively, to the bus 54. The above-mentioned signals relating to the sorting criterion and the resetting of the pointer need be activated only when a read operation is started.

The memory 52 is addressed by the signals on the bus 54. Its data input DIN first receives (inverted) the "clear" signal from command register 66, which signal controls a general reset. A write operation may then commence. The write enable signal is derived from the write signal R (together with "data" signal D and selection signal C̄S̄) received by the decoder 62, and is applied to input WEN. The presence of a delay element 80 in the relevant connection will be justified later. During a write operation, the signal "clear" equals zero, so that a "1" is stored each time 256 words (bytes) can thus be stored without giving rise to confusion. When two identical bytes are received in succession, however, the following happens. When the second byte arrives, the same location in the memory 52 is addressed again. The write control signal WEN, however, is delayed by the delay element 80 for a period of time which is small with respect to the duration of a memory cycle, so that always a read operation is performed first. Should the arrival of a given byte necessitate the filling of a given memory location for the second time, first a "1" is read (appearing at output DOUT) and is stored in flipflop (D-dlipflop) 82, co-controlled by a non-delayed synchronization signal on line 84. A "1" on line 87 indicates that a duplicate is occurring, thus acting as an overflow signal (OLBYT). It is applied as a status bit, via the multiple line 76, to the multiplexer 74 (which, however, continuously blocks during a write operation). The signal one line 84 is also applied to the clock input of a counter 86 which, therefore, updates its contents, which correspond to the number of "1" bits actually stored in the memory 52 provided that no duplicates have been received. This number can be read via the multiplexer 74 and the bus 54 in order to be applied, for example, to the processor 20 in FIG. 1.

During a read operation, the signal "clear" again has the value 0. Addressing is then performed by the address counter 64 while, because of the absence of a write control signal for the memory 52, the addresses thereof are successively read in a non-destructive manner. The address counter 64 is incremented or decremented by pulses from an oscillator 88 which have a frequency which is higher than the value corresponding to the length of a memory access cycle (as determined by the memory 22 in FIG. 1), for example ten times higher. The read cycle commences in that counter 64 receives a signal "reset pointer" on input 90 and the sorting criterion on input 92. When the sorting criterion is "increasing", the counter is set to "zero". When the sorting criterion is "decreasing" the counter 64 is set to "255". The pulses from the oscillator 88 then act as count-up pulses and count-down pulses, respectively. For as long as an empty memory location is read, nothing happens. However, as soon as a memory location is read which contains a "1", a set/rest flipflop 94 is set. The output signal Q̄ thereof first of all acts as a blocking signal for the counter 64 which is thus stopped. At the same time this output signal is applied to output 96 and acts as an indication of a ready state (RDY) in which the count of the counter 64 is available for reading. When subsquently a read control signal (RD) is received, flipflop 94 is reset and the counter 64 may resume counting until another occupied memory location is addressed. When the counter 64 has reached its maximum or minimum count, an output carry signal appears on the output 98, said output carry signal acting as a status signal in conjunction with the output signal on the output 87 of the flipflop 82. These status signals can be read, like the count of the counter 86, via multiplexer 74.

Figure 3:
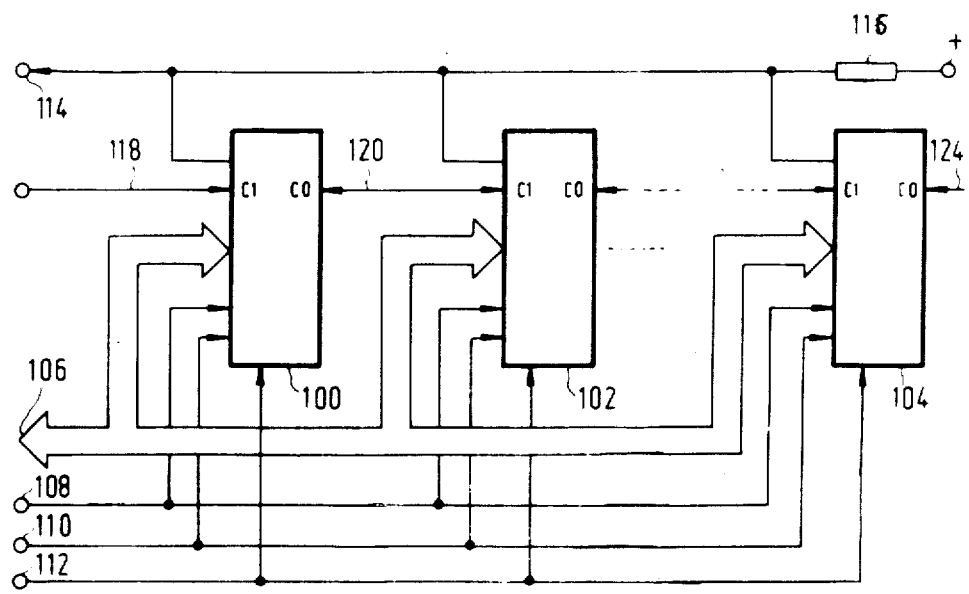
FIG. 3 shows a multiple sorting device.

FIG. 3 shows a multiple sorting device in which several bits can be stored per memory address. The constituent sorting devices are mainly connected in parallel and are thus connected to the data line 106 (54), the control inputs 108 (56) and 110 (58) and 112 (60) and the signalling output 114 (96). The internal signalling is as described with reference to FIG. 2 and reference numerals corresponding to those in FIG. 2 will be used in the following description, where appropriate. The line 114 forms a wired OR-circuit because of the presence of the resistor 116 which is connected to a positive supply voltage; the "ready" signal thus appears on output 114 when a "ready" state occurs in any of the parallel-connected sorting devices.

The successive filling of memory locations (first sorting device 100, followed by 102, 104) in the case of the occurrence of duplicate addresses is performed as follows. The described signal "chip select" appears on line 118 (input 60 in FIG. 2). The signal DOUT (from the memory 52 in FIG. 2) is outputted on a bidirecitonal line 120. In the case of a write operation, the gating direction is controlled from left to right in the Figure, for example by suitable control of connection buffers in the relevant devices 100 ... 104 by the R/$\overline{\text{W}}$ signal. In the case of a write operation, the signal on the line 120 acts as the "chip select" signal for the sorting device 102 and so on towards the right. Due to the normal delay times, a write operation is performed in at the most one sorting device during each write cycle. The overflow signal of the last sorting device 104 on the line 124 then acts as the overflow signal for the assembly.

During a read operation, said connection buffers are activated to operate only from right to left. Reading is now arranged to be destructive. The signal on the line 124 for the sorting device 104 is maintained at the correct level by a signal source (not shown). Only the counter 86 of the sorting device 100 indicates the correct total number of addresses received. The counter capacity must sometimes be adapted, for example because an additional status bit (line 76) is inserted as an additional more significant counter bit. The signal "read" is directly applied to the extreme right sorting device. Only the address counter of the extreme left sorting device is activated, so that all sorting devices "see" the same address via the bus 106. When an addressed location of the extreme right sorting device has been filled, this device outputs the "ready" signal by way of flipflop 94 (the address counter is deactivated). The inverted signal DOUT is then applied to the next left sorting device as an enable signal CO, so that the latter sorting device is read only when all devices situated further to the right have been read.

Figure 4:
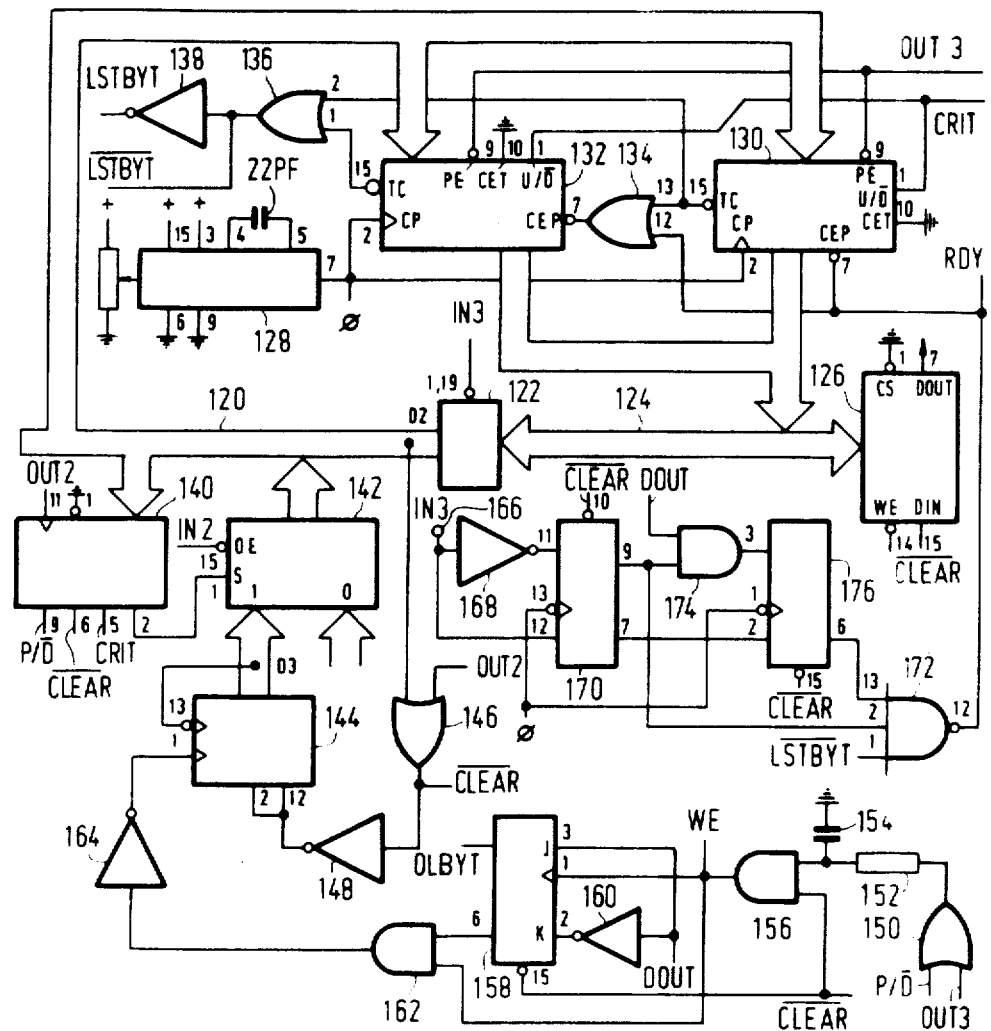
FIG. 4 is a more detailed circuit diagram of a sorting device.

FIG. 4 shows a more detailed circuit of a sorting device, that is to say at a level of a so-called breadboard circuit which is customarily used for design. The required numbers of logic elements and control lines can thus readily implemented. The circuit comprises a bidirectional bus 120 having a width of 8 bits. Via a buffer circuit 122 of the type SN 74 S 244 (make: AMD Corporation), this bus is connected to a second bus 124. The second bus is connected to the address input of a memory 126. The buffer 122 which transmits only in the direction right to left (see the subsequent description with reference to the counters 130, 132) is activated by a signal IN3. The latter signal is one of the signals supplied by the decoder 62 of FIG. 2, (which is not shown in FIG. 4). The memory 126 is of the type D2145 H1 (make: INTEL Corporation). Element 128 is an oscillator of the type 74 S 124 (make: Texas Instruments Corporation), only one half of which is used. An oscillator frequency of approximately 10 MHz is obtained by means of a capacitor of 22 pF. The oscillator 128 drives two cascade-connected four-bit counters 130, 132 of the type 74 S 169 (TI); the ripple-output carry TC of the counter 130 is applied to the counter 132 via OR-gate 134 (74 S 32, make: Signetics Corporation, this component in fact comprising four of such OR-gates). The ripple output carry TC of the counter 132 is outputted via an OR-gate 136 (same type as 134) and an inverter 138 (74 SO4, Signetics, this component in fact comprising six of such inverters). The maximum count signal (and the inverse thereof) is thus formed when both counter have reached their maximum count; this indicates the completion of a read operation: LSTBYT. The counters 130, 132 can be loaded with a specific count present on the bus 120 by way of another signal OUT3 from the control decoder. An arbitrary starting address can thus be supplied from the exterior. The signal CRIT determines the counting direciton. The signal RDY blocks the counting of both counters. The carry signal TC from the counter 130 acts as an enable signal allowing the counter 132 to be incremented or decremented by one unit each time (the signal TC subsequently disappears).

Element 140 is the command register (AMD type SN 74 LS 374) which is clocked by a signal OUT2. The signals PID, $\overline{\text{CLEAR}}$, CRIT and a selection signal for the element 142 are thus formed. The signal P/$\overline{\text{D}}$ indicates whether an eight-bit word to be received acts as pointer information or as a data word. The signal $\overline{\text{CLEAR}}$ controls a clear operation in the memory 126. The signal on output 2 controls an element 142. The element 142 is a demultiplexer of the type SN 74 LS 257 (T.I., two units connected in parallel) which is activated by a signal IN2. Its righthand inputs receive various status bits such as LSTBYT (from inverter 138), DOUT (from memory 126) and OLBYT (from a flipflop 158). The left-hand inputs of the demultiplexer 142 are connected to a counter 144. This is a counter of the type SN 74393 (T.I.) which counts the number of bytes received; actually, this counter is formed by two casade-connected four-bit counters. OR-gate 146 (same type as OR-gate 134) forms the inverted reset signal $\overline{\text{CLEAR}}$ from the signal D2 or OUT2. This reset signal is inverted by an inverter 148 (same type as inverter 138) in order to form the reset signal CLEAR for the resetting of the counter 144. The count input 13 of the second 4-bit counter contained in counter 144 receives the least-significant output bit D3 but three and the count input 1 of the first 4-bit counter is connected to a number of control elements which are arranged as follows. OR-gate 150 (same type as OR-gate 134) receives the signals OUT3 and P/$\overline{\text{D}}$. The value of the latter command signal indicates whether the information to be loaded into the counters 130–132 is a pointer or data. A delay time of approximately 150 ns is implemented by means of a suitably chosen resistor 152 and capacitor 154. AND-gate 156 is of the type 74 S 08 (Signetics, this component in fact comprising four AND-gates) which also receives the signal $\overline{\text{CLEAR}}$ formed by the gate 146. The gate 156 forms the write enable signal WE for the memory 126. The output signal of the gate 156 acts as a clock signal for a JK-flip-flop 158 of the type 74 S 112 (Signetics). This flipflop receives the data signal DOUT read (i.e. the byte representation read) from memory 126 directly and also via the inverter 160 (same type as inverter 138). The overflow signal OLBYT can thus be formed. The signal $\overline{\text{CLEAR}}$ resets the flipflop 158. The write enable signal WE is applied to the AND-gate 162 (same type as AND-gate 156) together with the signal indicating the non-overflow condition. The count signal for counter 144 is then formed by way of the inverter 164 (same type as inverter 138); thus, when the overflow signal appears, the latter counter does not continue counting so that the implementation differs slightly from FIG. 2.

The "ready" signal RDY is formed as follows. A control signal IN3, which is formed by a control decoder (not shown) in the manner described, arrives on input 166. This signal is applied to the relevant data inputs of a JK-flipflop 170 (one half of an element of the type 74 S 112, AMD) both in non-inverted form and also via an inverter 168 (same type as inverter 138). This flipflop is clocked by the output signal of the oscillator 128. The outputs of the flipflop 170 are coupled to the inputs of a flipflop 176 (same type as flipflop 179) inter alia via an AND-gate 174 (same type as AND-gate 156).

AND-gate 174 also receives the signal $\overline{DOUT}$. The flipflops 170, 176 receive the signal $\overline{CLEAR}$ as a reset signal and feed a NAND-gate 172 (element N74S10, Signetics, comprising three of such gates). This gate also receives a blocking signal $\overline{LSTBYT}$ and its output signal RDY also controls the counters 130 and 132.

It is possible to extend the arrangement shown in FIG. 4 so that pointer address words can also be stored. There are two possibilities. First of all, a data connection having a width of 16 bits, 8 bits of which are used as an address for the memory 126, may be provided. The further 8 bits are then used for a further memory which has a capacity of 256 words of 8 bits and is addressed together with the memory 126. The total memory capacity in this case thus amounts to 256 words of 9 bits. As an alternative it is possible to use only a data path having a width of 8 bits, but in that case the addresses for the memory 126 and the pointer address words must be supplied in a time multiplex fashion. In such a case a flip-flop which indicates the phase of the time multiplex, a bidirectional multiplexer/demultiplexer for applying the actual address or pointer address word to the appropriate user, and a register for the temporary storage of the actual address word for the memory until the arrival of the pointer address word will also be required. The multiplexing of addresses is well known from conventional 4 k and 16 k dynamic RAM memories. The pointer address word can address a further memory location, for example a segment table. The extra accommodation can also be used for the storage of non-address information. Using a memory having a width of 9 bits, 16-bits data words can then be sorted according to an 8-bit key.

Figure 5A:
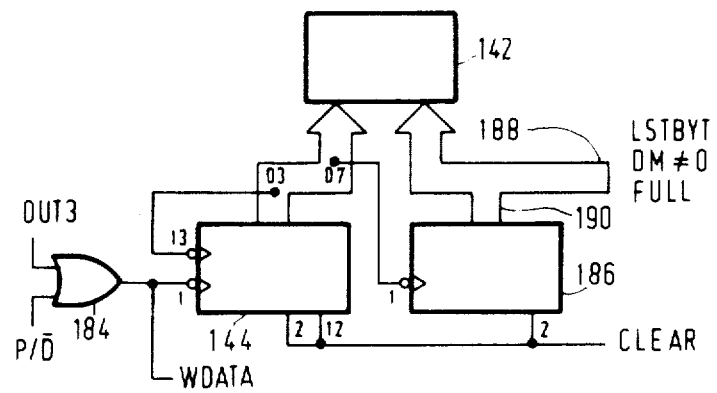
Figure 5B:
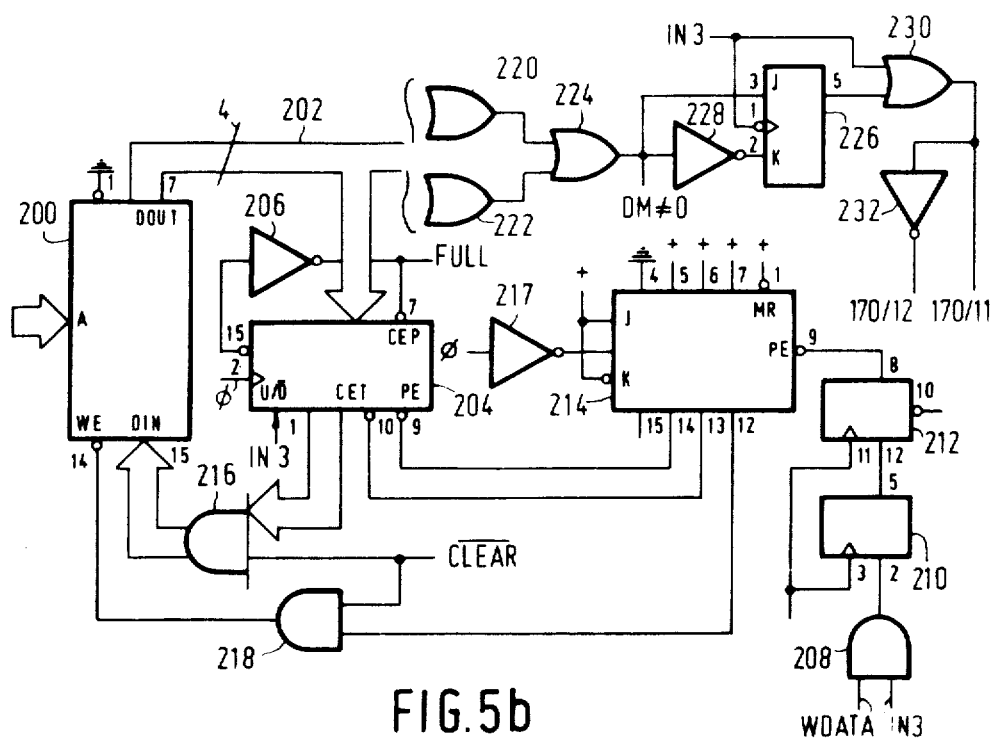

FIGS. 5a, 5b show a further elaboration of the circuit shown in FIG. 4, enabling at the most 16 of the same data words to be received and a degree of filling indication to be updated as the relevant memory address. FIG. 5a shows a first part of the elaboration. Element 142 is the already mentioned switch means of demultiplexer, which is controlled in the same way as in FIG. 4. The D3 output of total counter 144 is again fed to the clock input 13 of the second 4-bit counter contained therein. The count input 1 of the first 4-bit counter, however, is now directly connected to an OR-gate 184 (same type as OR-gate 136 in FIG. 4) which receives the same input signals as the OR-gate 150 in FIG. 4. Therefore, this may in fact be the OR-gate 150 itself, the elements of FIG. 4 intermediate this gate and counter 144 being omitted. The output signal of the gate 184 (WDATA) also acts as a write control signal for the data and is used in the circuit shown in FIG. 5b. The circuit furthermore comprises a second counter 186 (same type as the counter 144) which is controlled by the most-significant bit D7 on the output of the counter 144. Only four-bits of counter 186 are used, so that the four most-significant bits of the count indicating the total number of sorted elements appear on line 190. The contents of the counters 144, 186 are applied to the bus 120 in a time multiplex fashion, if necessary. The previously mentioned signal LDTBYT amd signals DM and FULL to be described hereinafter are supplied on the line 188 as the least-significant tetrade. The count states of the counters 144, 186 are erased in parallel.

FIG. 5b shows the extension of the actual data storage. This data storage takes place in a memory 200 having a capacity of 256 4-bit words (four modules similar to the memory 126 connected in parallel). For a write operation, first a read operation is performed in the described manner, so that the addressed tetrade appears on line 202 in order to be applied to an incrementer/decrementer 204; in this embodiment, the incrementer/decrementer is formed by a four-bit binary counter of the type SN 74 S 159 (T.I.). Its pin 1 receives the signal IN 3 (1 for a write operation, 0 for a read operation) which controls the counting direction. Terminal 2 carries the oscillator signal, the signal on pin 9 controls the loading of the count state, and the signals on the terminals 7 and 10 enable incrementation/decrementation to occur. An output carry signal which acts as an overflow signal FULL via inverter 206 (same type as inverter 138) and which blocks further incrementation appears on terminal 15.

The counter 204 is further controlled as follows. AND-gate 208 (same type as AND-gate 156) receives the signals IN3 and WDATA (the latter signal from the circuit of FIG. 5a). Both data flipflops 210, 212 (together forming one unit of the type 74 S 74 (T.I.) ) are set, synchronised by the clock signal, in order to activate a unit 214. The latter unit is a four-bit shift register having parallel inputs/outputs. This register acts as a programming counter. In reaction to the loading, a low signal is stored only from input 4 in order that it will appear directly on the non-connected output 15. Shift control is performed by the oscillator pulses which are inverted by the inverter 217 (same type as inverter 138). The JK-inputs are activated by a high and a low signal, respectively. Thus, the outputs 14, 13 and 12 of the shift register 214 successively become low in order to control successively the loading of the counter 204, the incrementation/decrementation thereof, and the rewriting of the modified data in the memory 200. This rewriting is achieved via an AND-gate 218 (same type as AND-gate 156) and a quadruple AND-gate 216 (four AND-gates of the same type as AND-gate 156 which are controlled in common). The gating signal for these AND-gates is the signal $\overline{CLEAR}$. The flip-flop 212 is reset by the "ready" signal (RDY). The components 152, 154, 156, 158, 160, 162, 164 of FIG. 4 have thus been omitted in this embodiment. The shift register 214 now acts as a delay element.

During a read operation, most events are as described with reference to FIG. 4. The output data of the memory 200 are combined in three OR-gates 220, 22 224 (same type as OR-gate 136). For as long as the read tetrade does not have the value "0", the signal DM≠0 mentioned with reference to FIG. 5a appears. For as long as this signal has the value "1" during a read operation, the addressed memory location still contains at least one representation of a data word.

Under the control of the signal IN3, the signal DM is stored in a JK-flipflop 226 (same type as JK-flipflop 170) inter alia via the inverter 228 (same type as inverter 138). Two further control signals are formed via OR-gate 230 (same type as OR-gate 136) and inverter 232 (same type as inverter 138). These signals are applied to the inputs 11 and 12 respectively of the flipflop 170 in FIG. 4 (consequently, the inverter 232 is the same as the inverter 168). It is thus achieved that each address location of the memory 200 is completely read before the address counter 130 continues counting.

Figure 6:
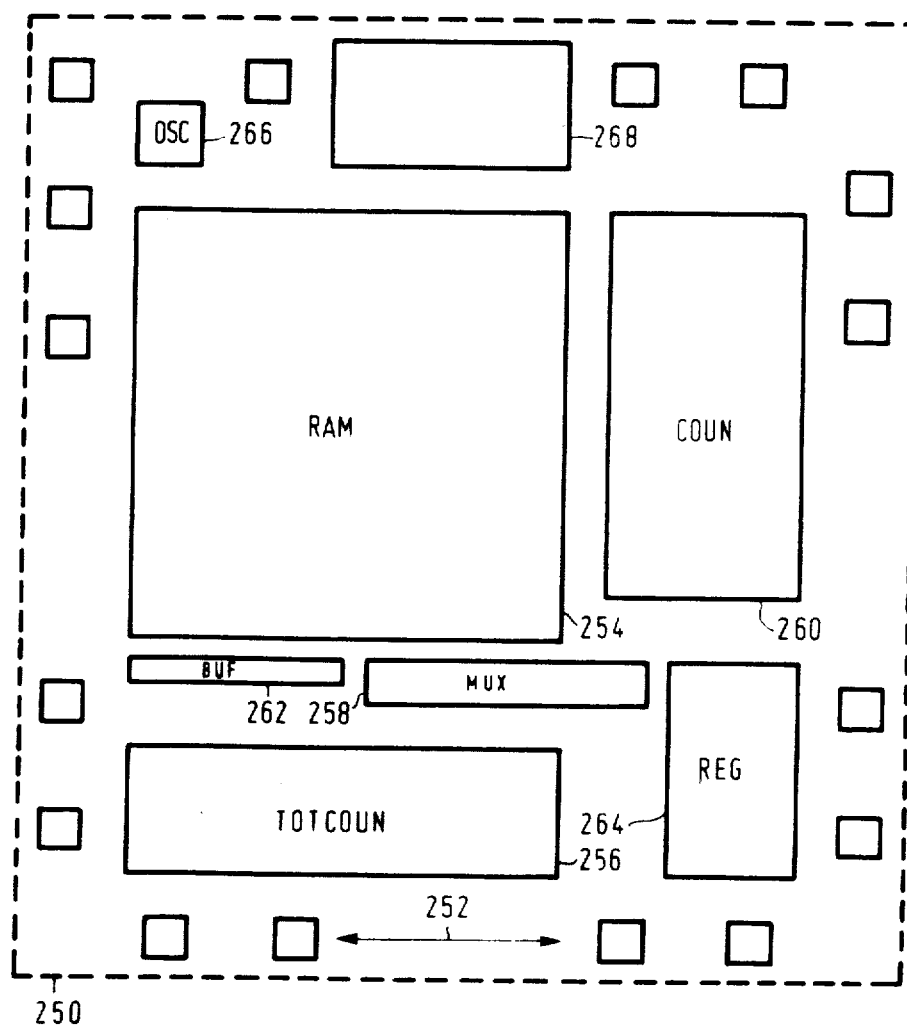
FIG. 6 shows how a sorting device may be configured for its actual construction as an integrated circuit.

FIG. 6 shows how a sorting device, that is to say a sorting device extended as described with reference to the FIGS. 5a and 5b, can be configured for the actual construction as an integrated circuit. The large-scale configuration of the various parts is shown, the separate units of the previous Figures, e.g. the various gates and the like, being implemented in these parts. The interrupted line denotes the edge of the so-called "chip". After the various integration steps such chips are separated from a wafer by means of a score mark having a width of, for example, 100 microns. The arrow 252 denotes a distance of 500 microns. Block 254 represents a memory comprising 32×32 cells of 1000 microns² each, thus having a total surface area of 1 mm². The organization is as described with reference to FIG. 5b (256×4). The memory may be constructed in conventional MOS-technology. The counters 144, 186 occupy (block 256) approximately 100 gate equivalents. The multiplexer 142 occupies approximately 24 gate equivalents (block 258). The counter 204 and the associated programming circuit 214 occupy approximately 130 gate equivalents (block 260). The buffer 122 occupies approximately 10 gate equivalents (block 262). The command register 140 occupies approximately 50 gate equivalents (block 264). The oscillator 128 occupies approximately 10 gate equivalents (block 266). A number of inverters, flipflops and further gates which are shown in the relevant Figures are combined in a control unit 268 (approximately 45 gate equivalents). Thus, there are approximately 430 gate equivalents of 3000 microns² each in total, these occupying a total surface area of 1.3 mm². The chip also comprises sixteen bond pads of 100×100 microns for thermally connecting external conductors (the squares at the relevant edges). These sixteen bond pads are reserved for:

eight-bit data bus
the control signals R/$\overline{W}$, D/$\overline{C}$, $\overline{CS}$
the ready signal RDY
the overflow signal FULL
the reset signal CLEAR
two supply voltages.

The clearances between the relevant constituent blocks are available for connection lines. The line width is in the order of 5 microns, and a surface area of approximately 1.7 mm² suffices for the assembly of bond pads, wiring and unused edge zones. In the embodiment shown, the total surface area amounts to 2.05+2.24==4.6 mm². This fits in a conventional plastic or ceramic envelope. When the sorting device is combined with another data processing device, for example a processor, in order to form a single integrated unit, some parts may be omitted. Notably the bond pads are not then directly required because data, address and control signals are exchanged with the processor. The number of bond pads of the unit will usually be larger (for example, 8 bits data, 16 bits address, voltage supply line, control lines, so easily forty pads or even more). The central oscillator of the processor can be used for the sorting device as well.

What is claimed is:

1. A sorting device for data words, comprising a data input for receiving the data words, a memory having an address input to which said data input is coupled and a data input which is activated in a write mode of operation to cause representations of data words received to be stored in said memory, and read control means for reading the representations stored at a sequence of addresses in said memory in order to present the memory address associated with each representation on a data output, characterized in that the sorting device is constructed as an integrated circuit and comprises a bidrectional bus which constitutes the device data input and the data output, a command register coupled to said bus for receiving memeory clear, sorting criterion and pointer reset signals therefrom, a counter having its count output coupled to said bus, which counter counts, in a read mode of operation, pulses from an oscillator in order to produce a sequence of addresses of the memory successively on its count output, said counter having inputs coupled to said command register for receiving said sorting criterion and pointer reset signals therefrom as count-determining and set-count signals respectively and a further output for a termination signal, said counter being provided with blocking means for blocking, under the control of the relevant representation, the counting of the oscillator pulses when an address which corresponds to a memory location containing a valid said representation appears on its count output and for producing a ready-to-read signal for a user device when this occurs, means being provided for resetting said blocking means, under the control of a memory read signal, to thereby terminate said blocking after the reading of the complete content of the memory location corresponding to the address currently present on the count output of the counter, means for applying, in said write mode of operation in response to received write commands, write and activation signals to said memory in such manner that each write signal will be delayed relative to the corresponding activation signal so that an intermediate read operation will occur at the same address, an overflow detection circuit for generating an overflow signal in response to the reading of a previously stored representation or predetermined number of previously stored representations in such an intermediate read operation, and switch means for applying said termination and overflow signals to the bus as status signals.

2. A device as claimed in claim 1, including a representation counter, means for incrementing the count in said representation counter each time a said write signal occurs at least if a said overflow signal is not produced in respect of the relevant write operation, and switch means for applying the count in said counter to said bus.

3. A device as claimed in claim 1 or claim 2, including a second bidirectional bus coupled to a further multi-bit data input/output of said memory for exchanging, together with the storage and retrieval of said representation, address pointer words for a further memory with said memory.

4. A device as claimed in claim 1 or claim 2, wherein said memory is capable of storing a plurality of said representations at each address and wherein means are provided for sequentially filling the storage capacity at the various addresses during successive write operations thereat and sequentially vacating the storage capacity at the various addresses during successive read operations thereat.

5. A sorting device as claimed in claim 1 or claim 2, characterized in that it is completely incorporated in a single integrated circuit.

6. A sorting device as claimed in claim 3 characterized in that it is completely incorporated in a single integrated circuit.

7. A sorting device as claimed in claim 4 characterized in that it is completely incorporated in a single integrated circuit.

8. An integrated data processor, characterized in that a sorting device for quickly data words is also integrated, comprising a first data input for the data words, a memory (254) comprising an address input which receives signals from the first data input, a second data input of said memory being activated in order to store a representation of said data word, said sorting device also comprising read means for reading the representations stored in an address sequence (260) in order to present the memory address associated with each representation on a data output again, the sorting device comprising a bidirectional bus as the first data input and data output which is connected to one of the internal bus lines of the data processor and also comprising control inputs for receiving erase control, sequence direction and address reset signals, and control outputs for supplying a termination signal and an overflow signal as status signals, to the bus there being connected a counter (260) which counts pulses from an oscillator in order to output the addresses of the memory successively on the counter output, said counter comprising inputs for receiving said sequence direction and address reset signals and an additional output for said termination signal, said counter also comprising a blocking means for blocking, under the control of the relevant representation, the counting of the oscillator pulses when a memory address is outputted which indicates a valid representation in said memory, thus supplying a "ready-to-read" signal, said blocking means comprising a reset input for terminating said blocking under the control of a read signal, after the reading of the complete content of a memory address, said memory device also comprising a delay element for delaying a write command received in order to perform an intermediate read operation under the control of an activation signal, there also being provided a detection circuit for the selective formation of said overflow signal under the control of a read, previously stored representation and the last write command received.

* * * * *